United States Patent
Kuo

(10) Patent No.: US 11,238,183 B2
(45) Date of Patent: Feb. 1, 2022

(54) DATA PROTECTION SYSTEM AND METHOD

(71) Applicant: INNODISK CORPORATION, New Taipei (TW)

(72) Inventor: Chin-Chung Kuo, New Taipei (TW)

(73) Assignee: Innodisk Corporation, New Taipei (TW)

(*) Notice: Subject to any disclaimer, the term of this patent is extended or adjusted under 35 U.S.C. 154(b) by 0 days.

(21) Appl. No.: 17/038,596

(22) Filed: Sep. 30, 2020

(65) Prior Publication Data

US 2021/0326491 A1 Oct. 21, 2021

(30) Foreign Application Priority Data

Apr. 20, 2020 (TW) ................................ 109113224

(51) Int. Cl.
| | |
|---|---|
| *G06F 21/00* | (2013.01) |
| *G06F 21/79* | (2013.01) |
| *G06F 21/73* | (2013.01) |
| *G06F 21/62* | (2013.01) |
| *H04L 29/12* | (2006.01) |
| *H04L 29/06* | (2006.01) |
| *H04L 9/08* | (2006.01) |
| *G06F 21/60* | (2013.01) |

(52) U.S. Cl.
CPC ............ *G06F 21/79* (2013.01); *G06F 21/602* (2013.01); *G06F 21/6218* (2013.01); *G06F 21/73* (2013.01); *H04L 9/0872* (2013.01); *H04L 61/6022* (2013.01); *H04L 63/0236* (2013.01); *H04L 63/0435* (2013.01)

(58) Field of Classification Search
None
See application file for complete search history.

(56) References Cited

U.S. PATENT DOCUMENTS

| | | | |
|---|---|---|---|
| 9,148,426 B2* | 9/2015 | Goodman | H04L 63/0823 |
| 9,704,586 B1* | 7/2017 | Kao | G11C 16/22 |
| 10,884,951 B2* | 1/2021 | Morrison | G11C 16/22 |
| 2017/0147825 A1* | 5/2017 | Barton | H04W 12/08 |
| 2018/0101685 A1* | 4/2018 | Amidi | H04L 9/0861 |
| 2019/0258831 A1* | 8/2019 | Abnett | G06F 21/86 |
| 2019/0266361 A1* | 8/2019 | Halladay | G06F 21/60 |

(Continued)

*Primary Examiner* — Jeffery L Williams
(74) *Attorney, Agent, or Firm* — Rosenberg, Klein & Lee

(57) ABSTRACT

A data protection system is disclosed. The data protection system comprises a cloud management platform and at least one data storage device. The cloud management platform includes a database stored with at least one key. The data storage device includes a data storage unit, a microprocessor, and a network communication component. The microprocessor is communicated with the cloud management platform by the network communication component. The data storage unit comprises a controller and a plurality of flash memories. The flash memories store a plurality of encrypted data. The microprocessor sends a key extraction request including a unique code to the cloud management platform. The cloud management platform selects the key matching to the unique code in the key extraction request from the database, and transmits the selected key to the data storage device. The controller of the data storage device decrypts the encrypted data by the key.

6 Claims, 3 Drawing Sheets

(56) References Cited

U.S. PATENT DOCUMENTS

| | | | |
|---|---|---|---|
| 2019/0362080 A1* | 11/2019 | Achillopoulos | H04L 41/24 |
| 2020/0106607 A1* | 4/2020 | Lo | H04L 9/3247 |
| 2020/0174948 A1* | 6/2020 | Morrison | G06F 12/14 |
| 2021/0034441 A1* | 2/2021 | Wu | G06F 8/65 |
| 2021/0103527 A1* | 4/2021 | Morrison | G06F 21/554 |

* cited by examiner

DATA PROTECTION SYSTEM AND METHOD

This non-provisional application claims priority claim under 35 U.S.C. § 119 (a) on Taiwan Patent Application No. 109113224 filed Apr. 20, 2020, the entire contents of which are incorporated herein by reference.

FIELD OF THE INVENTION

The present invention relates to a data protection system and method, more particularly, a system and method capable of implementing a data protection to a data storage device by a key provided by a cloud.

BACKGROUND

With the need for data storage, a data storage data, for example, solid state drive (SSD), memory card, or portable disk, often used by a host to store important data. In order to prevent the important data stored in the data storage device be stolen or copied at random, a data encryption mechanism is usually added to the data storage device. For example, a 128-bit or 256-bit AES key can be used to encrypt the data written to the data storage device or decrypt the data read from the data storage device.

In the past, the AES key may store in a specific data block of the flash memories of the data storage device or a specific chip (such as EEPROM) of the data storage device. In the encryption and decryption data process, a controller of the data storage device extracts the AES key from the specific data block or the specific chip. Otherwise, the AES key can also be stored in a software protection dongle. When the software protection dongle is inserted into a connection port (such as USB connection port) of a computer host, the controller of the data storage device disposed in the computer host will extract the AES key from the software protection dongle to encrypt and decrypt the data accessed from the data storage device by the extracted AES key.

For the above ways of storing AES key, anyone can easily access the important data stored in the data storage device as long as the data storage device or software encryption device is pulled out of the host, such that the data protection is flawed. Besides, the specific data block, the specific chip, or the software protection dongle stored with the key is damaged or lost, which will result in the data stored in the data storage device to be not used.

SUMMARY

It is one objective of the present invention to provide a data protection system, which comprises a cloud management platform and a data storage device. The data stored in the data storage device can be protected via an encryption mechanism, and a key for decrypting data can be stored in the cloud management platform. The data storage device communicates with the cloud management platform by a network to extract the key from the cloud management platform. Accordingly, the key is disposed in the cloud to avoid the loss of the keys and the embarrassment that the data storage device cannot be used.

It is another objective of the present invention to provide a data protection system, in which when the data storage device is communicated with the cloud management platform by the network, the cloud management platform determines whether a physical IP address which is used for connecting the network by the data storage device is a registered IP address; if the physical IP address used by the data storage device is a registered IP address, the cloud management platform transmits the key to the data storage device; if the physical IP address used by the data storage device is an unknown IP address, the cloud management platform will be inhibited to transmit the key to the data storage device.

It is another objective of the present invention to provide a data protection system, wherein the data protection system is able to track the physical IP address used by the data storage device, it can not only position the usage location of the data storage device, and inhibit the data storage device to be used in an unknown locations to improve the security of data protection.

It is another objective of the present invention to provide a data protection system, wherein when the data protection system tracks that the physical IP address used by the data storage device is an unknown IP address, it will send an access instruction or a destroying physical instruction to the data storage device to inhibit the data stored in the data storage device to be accessed or destroy the memory elements of the data storage device, such that the data stored in the data storage device to be stolen.

To achieve the above objective, the present invention provides a data protection system, comprising: a cloud management platform comprising a database stored with a plurality of keys; and a data storage device, configured with a unique code, and comprises a data storage unit, a microprocessor, and a network communication component, wherein the microprocessor is connected to the data storage unit, and communicates with the cloud management platform via the network communication component, the data storage unit comprises a controller and a plurality of flash memories connected to the controller, the plurality of flash memories store a plurality of encrypted data; wherein the microprocessor sends a key extraction request including the unique code to the cloud management platform via the network communication component; the cloud management platform selects one of the keys matching to the unique code in the key extraction request from the database, and transmits the selected key to the data storage device; thereby, the controller of the data storage device uses the key from the cloud management platform to decrypt the encrypted data.

In one embodiment of the present invention, wherein the database of the cloud management platform registers a plurality of IP addresses; when the network communication component of the data storage device is connected to a network by a physical IP address, the microprocessor of the data storage device embeds the physical IP address into the key extraction request, and sends the key extraction request including the unique code and the physical IP address to the cloud management platform; the cloud management platform determines whether the physical IP address in the key extraction request is registered in the database after receiving the key extraction request so as to decide whether to transmit the key matching to the unique code of the key extraction request to the data storage device.

In one embodiment of the present invention, wherein the database of the cloud management platform registers a plurality of IP addresses, and stores a geographic position corresponding to each of the plurality of IP addresses; when the network communication component of the data storage device is connected to a network by a physical IP address, the microprocessor of the data storage device embeds the physical IP address into the key extraction request, and sends the key extraction request including the unique code and the physical IP address to the cloud management platform; if the cloud management platform determines that the physical IP address of the key extraction request has registered in the database after receiving the key extraction request, the cloud management platform will inquire the geographic position corresponding to the physical IP address of the key extraction request.

In one embodiment of the present invention, wherein if the cloud management platform determines that the physical IP address of the key extraction request is not registered in the database after receiving the key extraction request, the cloud management platform will send an access protection instruction to the data storage device, and then the microprocessor of the data storage device demands that the controller executes a partition locking procedure to the flash memories so as to lock at least one partition of the flash memories, and therefore inhibit to access the data in the at least one locked partition.

In one embodiment of the present invention, wherein if the cloud management platform determines that the physical IP address of the key extraction request is not registered in the database after receiving the key extraction request, the cloud management platform will send a destroying physical instruction to the data storage device, and then the microprocessor of the data storage device enables a high voltage circuit according to the destroying physical instruction to output a high voltage to the flash memories to destroy the flash memories.

In one embodiment of the present invention, wherein the unique code is a MAC address of the network communication component, a chip serial number of the data storage device, or a product serial number of the data storage device.

In one embodiment of the present invention, wherein the network communication component is configured within the microprocessor.

The present invention further provides a data protection method adapted for a data protection system comprising a cloud management platform and a data storage device, wherein the cloud management platform comprises a database stored with a plurality of keys, the data storage device is configured with a unique code, and comprises a data storage unit, a microprocessor, and a network communication component, the microprocessor communicates with the cloud management platform via the network communication component, the data storage unit comprises a controller and a plurality of flash memories, the plurality of flash memories store a plurality of encrypted data, the data protection method comprising: sending a key extraction request including the unique code to the cloud management platform by the microprocessor; selecting one of the keys matching to the unique code of the key extraction request from the database by the cloud management platform; transmitting the selected key to the data storage device by the cloud management platform; and decrypting the encrypted data via the key received from the cloud management platform by the controller of the data storage device.

In one embodiment of the present invention, wherein the database of the cloud management platform registers a plurality of IP addresses; when the network communication component of the data storage device is connected to a network by a physical IP address, the data protection method further comprising: embedding the physical IP address into the key extraction request by the microprocessor; sending the key extraction request including the unique code and the physical IP address to the cloud management platform by the microprocessor; and determining whether the physical IP address in the key extraction request is registered in the database by the cloud management platform after receiving the key extraction request; if the physical IP address in the key extraction request has registered in the database, allowing the cloud management platform to transmit the key matching to the unique code to the data storage device; if the physical IP address in the key extraction request is not registered in the database, inhibiting the cloud management platform to transmit the key matching to the unique code to the data storage device.

In one embodiment of the present invention, wherein the database of the cloud management platform registers a plurality of IP addresses, and stores a geographic position corresponding to each of the plurality IP addresses; when the network communication component of the data storage device is connected to a network by a physical IP address, the data protection method further comprising: embedding the physical IP address into the key extraction request by the microprocessor; sending the key extraction request including the unique code and the physical IP address to the cloud management platform by the microprocessor; and inquiring the geographic position corresponding to the physical IP address in the key extraction request after the cloud management platform determines that the physical IP address of the key extraction request received from the data storage device has registered in the database.

In one embodiment of the present invention, the data protection method further comprising: sending an access protection instruction to the data storage device when the cloud management platform determines that the physical IP address of the key extraction request received from the data storage device is not registered in the database; and executing a partition locking procedure to the flash memories by the controller according to the access protection instruction so as to lock at least one partition of the flash memories and therefore inhibit to access the data in the at least one locked partition.

In one embodiment of the present invention, the data protection method further comprising: sending a destroying physical instruction to the data storage device when the cloud management platform determines that the physical IP address of the key extraction request received from the data storage device is not registered in the database; and enables a high voltage circuit by the microprocessor according to the destroying physical instruction to output a high voltage to the flash memories to destroy the flash memories.

DETAILED DESCRIPTION OF THE PREFERRED EMBODIMENTS

Figure 1:
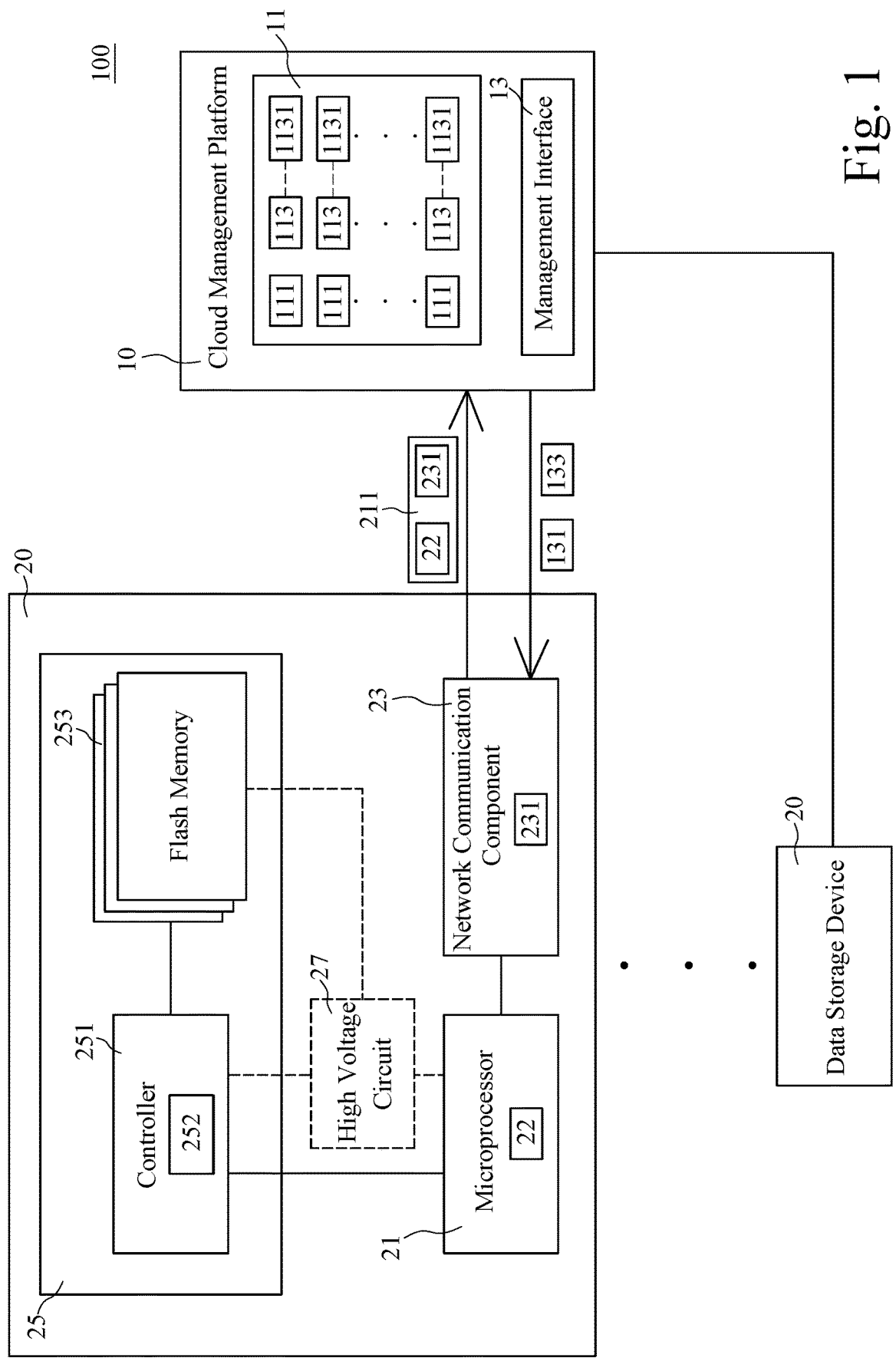
FIG. 1 is an architecture diagram of a data protection system according to one embodiment of the present invention.

Referring to FIG. 1, there is shown an architecture diagram of a data protection system according to one embodiment of the present invention. As shown in FIG. 1, the data protection system 100 comprises a cloud management platform 10 and at least one data storage device 20. The data storage device 100 may be a solid-state hard drive, a memory card, or a flash drive. The data storage device 100 includes a microprocessor 21, a network communication component 23, and a data storage unit 25. The data storage device 20 comprises a microprocessor 21, a network communication component 23, and a data storage unit 25. The microprocessor 21 is connected to the data storage unit 25, and communicates with the cloud management platform 10 via the network communication component 23. The network communication component 23 is a WiFi communication component, an Ethernet communication component, a 4G or 5G communication component, or other networkable communication component. The microprocessor 21 and the network communication component 23 are independent components, respectively. Otherwise, the microprocessor 21 is a chip with network communication function, for example, a network communication component 23 is integrated in the microprocessor 21. The data storage unit 25 comprises a controller 251 and a plurality of flash memories 253. In the present invention, the controller 251 comprises an encryption engine 252. The flash memories 253 store a plurality of data. The controller 251 encrypts the data in the flash memories 253 by the encryption engine 252.

The data storage device 20 is configured with a unique code 22. The unique code 22 is a MAC address of the network communication component 23, a chip serial number of the data storage device 20, or a product serial number of the data storage device 20. The cloud management platform 10 comprises a database 11 stored with at least one key 111. The key 111 may be a key related with an advanced encryption standard (AES). The unique code 22 of each of the data storage devices 20 is matched with one of the keys 111 stored in the database 11 of the cloud management platform 10, respectively.

When the data storage device 20 is power on, the microprocessor 21 will actively send a key extraction request 211 including the unique code 22 to the cloud management platform 10. After the cloud management platform 10 receives the key extraction request 211, it will select one key 111 from the database 11 matching to the unique code 22 of the key extraction request 211, and transmit the selected key 111 to the data storage device 20. After the microprocessor 21 receives the key 111 via the network communication component 23, it will further transmit the key 111 to the controller 251. The encryption engine 252 of the controller 251 decrypt the encrypted data in the flash memories 253 by the key 111, such that the data in the flash memories can be accessed normally. When the cloud management platform 10 receives the unique code 22, it will know that the data storage device 20 is started, and record the usage condition of the data storage device 20.

The database 11 of the cloud management platform 10 registers a plurality of IP addresses 113. When the network communication component 23 of the data storage device 20 is connected to a network by a physical IP address (such as fixed or floating physical IP address) 231, the microprocessor 21 of the data storage device 20 embeds the physical IP address 231 into the key extraction request 211, and send the key extraction request 211 including the physical IP address 231 and the unique code 22 to the cloud management platform 10. After the cloud management platform 10 receives the key extraction request 211, it will determine whether the physical IP address 231 in the key extraction request 211 is registered in the database 11 so as to decide whether to transmit the key 111 matching to the unique code 22 of the key extraction request 211 to the data storage device 20. If the physical IP address 231 in the key extraction request 211 has registered in the database 11, the cloud management platform is allowed to transmit the key 111 to the data storage device 20. On the contrary, the physical IP address 231 in the key extraction request 211 is not registered in the database 11, the cloud management platform 10 will be inhibited to transmit the key 111 to the data storage device 20. On other words, when the data storage device 20 is connected the network by the physical IP address 231 approved by the cloud management platform 10, the cloud management platform 10 will send the key 111 to the data storage device 20; on the contrary, when the data storage device 20 is connected the network by an unknown physical IP address 231, the cloud management platform 10 does not send the key 111 to the data storage device 20.

Further, the database 11 of the cloud management platform 10 stores a geographic position 1131 corresponding to each of the IP addresses 113. When the microprocessor 21 of the data storage device 20 sends the key extraction request 211 to the cloud management platform 10, the cloud management platform 10 determines whether the physical IP address 231 in the key extraction request 211 is registered in the database 11. If the physical IP address 231 of the key extraction request 211 is registered in the database 11, the cloud management platform 10 will inquire the geographic position 1131 corresponding to the physical IP address 231. In this way, the cloud management platform 10 can track the physical IP address 231 used by the data storage device 20 to know the geographic position 1131 where the data storage device 20 is used.

In one embodiment of the present invention, if the cloud management platform determines that the physical IP address 231 of the key extraction request 211 is not registered in the database 11 after receiving the key extraction request 211, it will send an access protection instruction 131 to the data storage device 20 by a programmable management interface 13. The microprocessor 21 of the data storage device 20 demands that the controller 21 executes a partition locking procedure to the flash memories 253 to lock at least one partition of the flash memories 253, and therefore inhibit to access the data in the locked partition of the flash memories 253.

In another embodiment of the present invention, the data storage device 20 further comprises a high voltage circuit 27. The high voltage circuit 27 is connected to the microprocessor 21 and the data storage unit 25. If the cloud management platform 10 determines that the physical IP address 231 of the key extraction request 211 is not registered in the database 11 after receiving the key extraction request 211, it will send a destroying physical instruction 133 to the data storage device 20 by the management interface 13. The microprocessor 21 of the data storage device 20 enables the high voltage circuit 27 according to the destroying physical instruction 133 to output a high voltage to the controller 251 and the flash memories 253 such that the controller 251 and the flash memories 253 can be destroyed by the high voltage. Thus, when the data storage device 20 is connected to the network by the unauthorized physical IP address 231 and therefore is used in an unallowable geographic location, an administrator of the cloud management platform 10 can remotely perform an access protection operation or a physical destruction operation to the flash memories 253 of the data storage device 20 so as to avoid the data stored in the flash memories 253 to be stolen.

Accordingly, the data protection system 100 of the present invention disposes the keys 111 in the cloud to avoid the loss of the keys 111 and the embarrassment that the data storage device 20 cannot be used. Besides, by tracking the physical IP address 231 used by the data storage device 20, the data protection system 100 of the present invention can locate the usage position of the data storage device 20, and inhibit the data storage device 20 to be used in an unknown location to improve the security of data protection.

Figure 2:
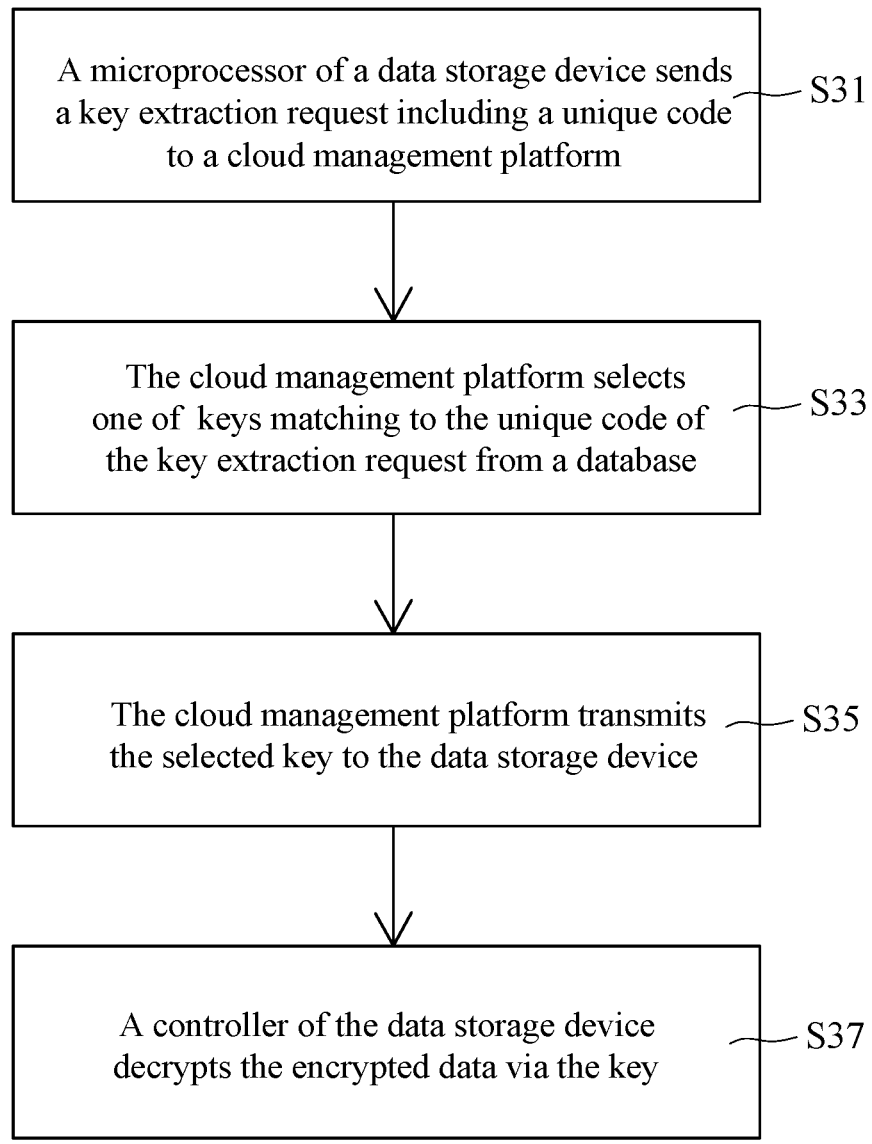
FIG. 2 is a flow chart of a data protection method according to one embodiment of the present invention.

Referring to FIG. 2, there is shown a flow chart of a data protection method according to one embodiment of the present invention with further reference to FIG. 1. As shown in FIG. 2, firstly, in step S31, the microprocessor 21 of the data storage device 20 sends the key extraction request 211 including the unique code 22 to the cloud management platform 10 via the network communication component 23. In step S33, the cloud management platform 10 selects one key 111 matching to the unique code 22 of the key extraction request 211 from the database 111. In step S35, the cloud management platform 10 sends the selected key 111 to the data storage device 20. In step S37, the microprocessor 21 of the data storage device 20 further transmits the key 111 to the controller 251 of the data storage unit 25 after receiving the key 111 from the cloud management platform 10 via the network communication component 23. Afterwards, the controller 251 decrypts the encrypted data in the flash memories 253 by the key 111 such that the data storage device 20 can be used normally.

Figure 3:
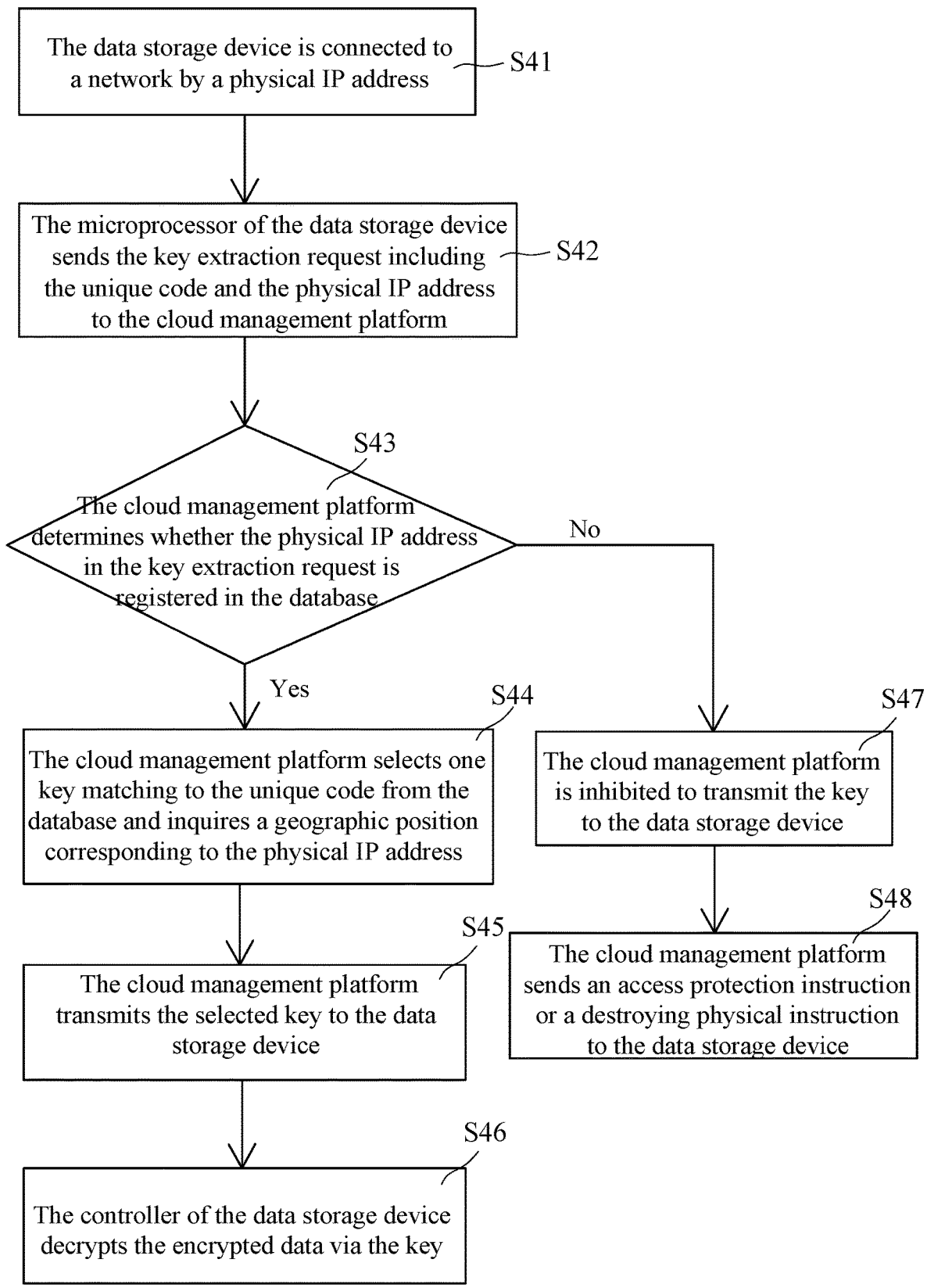
FIG. 3 is a flow chart of the data protection method according to another embodiment of the present invention.

Referring to FIG. 3, there is shown a flow chart of the data protection method according to another embodiment of the present invention with further reference to FIG. 1. As shown in FIG. 3, firstly, in step S41, the network communication component 23 of the data storage device 20 is connected to the network by a physical IP address 231. In step S42, the microprocessor 21 of the data storage device 20 sends a key extraction request 211 including a unique code 22 and the physical IP address 231 to the cloud management platform 10. In step S43, after the cloud management platform 10 receives the key extraction request 211, it determines whether the physical IP address 231 in the key extraction request 211 is registered in the database 11; if the physical IP address 231 in the key extraction request 211 has registered in the database 11, continuing to perform steps S44, S45, and S46. In step S44, the cloud management platform 10 selects one key 111 matching to the unique code 22 in the key extraction request 211 from the database 11. In step S45, the cloud management platform 10 transmits the selected key 111 to the data storage device 20. In step S46, the controller 251 of the data storage device 20 decrypts the encrypted data in the flash memories 253 by the key 111. Besides, in step S44, the cloud management platform 10 further inquires a corresponding geographic position 1131 from the database 11 according to the physical IP address of the key extraction request 211.

Returning step S43, if the cloud management platform 10 determines that the physical IP address 231 of the key extraction request 211 is not registered in the database 11, continuing to perform steps S47 and S48. In steps S47 and S48 of one embodiment of the present invention, the cloud management platform 10 will be inhibited to transmit the key 111 to the data storage device 20, and send an access protection instruction 131 to the data storage device 20; then, the microprocessor 21 of the data storage device 20 demands that the controller 251 executes a partition locking procedure to the flash memories 253 so as to lock at least one partition of the flash memories 253, and therefore inhibit to access the data in the locked partition. In steps S47 and S48 of another embodiment of the present invention, the cloud management platform 10 will be inhibited to transmit the key 111 to the data storage device 20, and send a destroying physical instruction 133 to the data storage device 20; then, the microprocessor 21 of the data storage device 20 enables a high voltage circuit 27 according to the destroying physical instruction 133 to output a high voltage to the controller 251 and the flash memories 253 to destroy controller 251 and the flash memories 253 by the high voltage.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A data protection system, comprising:
a cloud management platform comprising a database stored with a plurality of keys; and
a data storage device, configured with a unique code, and comprises a data storage unit, a microprocessor, and a network communication component, wherein the microprocessor is connected to the data storage unit, and communicates with the cloud management platform via the network communication component, the data storage unit comprises a controller and a plurality of flash memories connected to the controller, the plurality of flash memories store a plurality of encrypted data;
wherein the microprocessor sends a key extraction request including the unique code to the cloud management platform via the network communication component; the cloud management platform selects one of the keys matching to the unique code in the key extraction request from the database, and transmits the selected key to the data storage device; thereby, the controller of the data storage device uses the key from the cloud management platform to decrypt the encrypted data;
wherein the database of the cloud management platform registers a plurality of IP addresses; when the network communication component of the data storage device is connected to a network by a physical IP address, the microprocessor of the data storage device embeds the physical IP address into the key extraction request, and sends the key extraction request including the unique code and the physical IP address to the cloud management platform; the cloud management platform determines whether the physical IP address in the key extraction request is registered in the database after receiving the key extraction request so as to decide whether to transmit the key matching to the unique code of the key extraction request to the data storage device;
and
wherein if the cloud management platform determines that the physical IP address of the key extraction request is not registered in the database after receiving the key extraction request, the cloud management platform will send a destroying physical instruction to the data storage device, and then the microprocessor of the data storage device enables a high voltage circuit according to the destroying physical instruction to output a high voltage to the flash memories to destroy the flash memories.

2. The data protection system according to claim 1, wherein the database of the cloud management platform registers a plurality of IP addresses, and stores a geographic position corresponding to each of the plurality of IP addresses;
when the network communication component of the data storage device is connected to a network by a physical IP address, the microprocessor of the data storage device embeds the physical IP address into the key extraction request, and sends the key extraction request including the unique code and the physical IP address to the cloud management platform; if the cloud management platform determines that the physical IP address of the key extraction request has registered in the database after receiving the key extraction request, the cloud management platform will inquire the geographic position corresponding to the physical IP address of the key extraction request.

3. The data protection system according to claim 1, wherein the unique code is a MAC address of the network communication component, a chip serial number of the data storage device, or a product serial number of the data storage device.

4. The data protection system according to claim 1, wherein the network communication component is configured within the microprocessor.

5. A data protection method adapted for a data protection system comprising a cloud management platform and a data storage device, wherein the cloud management platform comprises a database stored with a plurality of keys, the data storage device is configured with a unique code, and comprises a data storage unit, a microprocessor, and a network communication component, the microprocessor communicates with the cloud management platform via the network communication component, the data storage unit comprises a controller and a plurality of flash memories, the plurality of flash memories store a plurality of encrypted data, the data protection method comprising:

sending a key extraction request including the unique code to the cloud management platform by the microprocessor;

selecting one of the keys matching to the unique code of the key extraction request from the database by the cloud management platform;

transmitting the selected key to the data storage device by the cloud management platform; and decrypting the encrypted data via the key received from the cloud management platform by the controller of the data storage device;

wherein the database of the cloud management platform registers a plurality of IP addresses; when the network communication component of the data storage device is connected to a network by a physical IP address, the data protection method further comprising:

embedding the physical IP address into the key extraction request by the microprocessor;

sending the key extraction request including the unique code and the physical IP address to the cloud management platform by the microprocessor; and determining whether the physical IP address in the key extraction request is registered in the database by the cloud management platform after receiving the key extraction request; if the physical IP address in the key extraction request has registered in the database, allowing the cloud management platform to transmit the key matching to the unique code to the data storage device; if the physical IP address in the key extraction request is not registered in the database, inhibiting the cloud management platform to transmit the key matching to the unique code to the data storage device;

sending a destroying physical instruction to the data storage device when the cloud management platform determines that the physical IP address of the key extraction request received from the data storage device is not registered in the database; and enabling a high voltage circuit by the microprocessor according to the destroying physical instruction to output a high voltage to the flash memories to destroy the flash memories.

6. The data protection method according to claim 5, wherein the database of the cloud management platform registers a plurality of IP addresses, and stores a geographic position corresponding to each of the plurality IP addresses; when the network communication component of the data storage device is connected to a network by a physical IP address, the data protection method further comprising:

embedding the physical IP address into the key extraction request by the microprocessor;

sending the key extraction request including the unique code and the physical IP address to the cloud management platform by the microprocessor; and inquiring the geographic position corresponding to the physical IP address in the key extraction request after the cloud management platform determines that the physical IP address of the key extraction request received from the data storage device has registered in the database.

* * * * *